United States Patent [19]

Jones et al.

[11] 4,350,657
[45] Sep. 21, 1982

[54] LOW-ENERGY EXTRUDER-PUMP SYSTEM

[75] Inventors: David N. Jones, Long Valley; Archibald L Burnett, Warren; John C. Miller, Piscataway, all of N.J.

[73] Assignee: Union Carbide Corporation, Danbury, Conn.

[21] Appl. No.: 204,001

[22] Filed: Nov. 4, 1980

[51] Int. Cl.³ .......................... B29B 1/04; B29B 1/06
[52] U.S. Cl. ................... 264/349; 264/176 R; 366/81; 366/87; 366/89; 425/208; 425/376 B
[58] Field of Search ............... 264/349, 176 R, 40.7; 425/208, 376 B; 366/89, 90, 81, 87

[56] References Cited

U.S. PATENT DOCUMENTS

| 2,756,574 | 9/1956 | Maddock | 259/193 |
|---|---|---|---|
| 3,131,430 | 5/1964 | Rodenacker | 425/208 |
| 3,444,283 | 5/1969 | Carlson | 264/53 |
| 3,486,192 | 12/1969 | LeRoy | 366/82 |
| 3,524,222 | 8/1970 | Gregory et al. | 425/203 |
| 3,655,850 | 4/1972 | Woodham et al. | 264/118 |
| 3,730,492 | 5/1973 | Maddock | 259/193 |
| 3,737,506 | 6/1973 | Martin et al. | 264/349 |
| 3,788,612 | 1/1974 | Dray | 425/208 |
| 3,850,414 | 11/1974 | Scharer | 259/191 |
| 3,863,905 | 2/1975 | Maxwell | 425/208 |
| 4,013,745 | 3/1977 | Brinkmann et al. | 264/176 R |
| 4,032,391 | 6/1977 | Moked et al. | 159/47 |
| 4,053,143 | 10/1977 | Hosokawa et al. | 366/89 |
| 4,078,113 | 3/1978 | Starbuck et al. | 264/176 R |
| 4,085,461 | 4/1978 | Maillefer | 366/90 |
| 4,137,023 | 1/1979 | Moked et al. | 418/15 |
| 4,155,655 | 5/1979 | Chiselko | 366/83 |
| 4,171,193 | 10/1979 | Rahlfs | 264/40.7 |
| 4,209,476 | 6/1980 | Harris | 264/40.7 |

FOREIGN PATENT DOCUMENTS 2153143  5/1973  Fed. Rep. of Germany ...... 425/208

Primary Examiner—Jeffery R. Thurlow
Attorney, Agent, or Firm—Gerald R. O'Brien

[57] ABSTRACT

Method and apparatus are disclosed for the low energy melting, extrusion and pumping of material comprising feeding, metering, melting and mixing of such materials in an extruder having a melter screw and subsequently passing the resultant extrudate, through breaker plate and adapter means, to and through a rotary gear pump and, in turn, to a die member.

8 Claims, 3 Drawing Figures

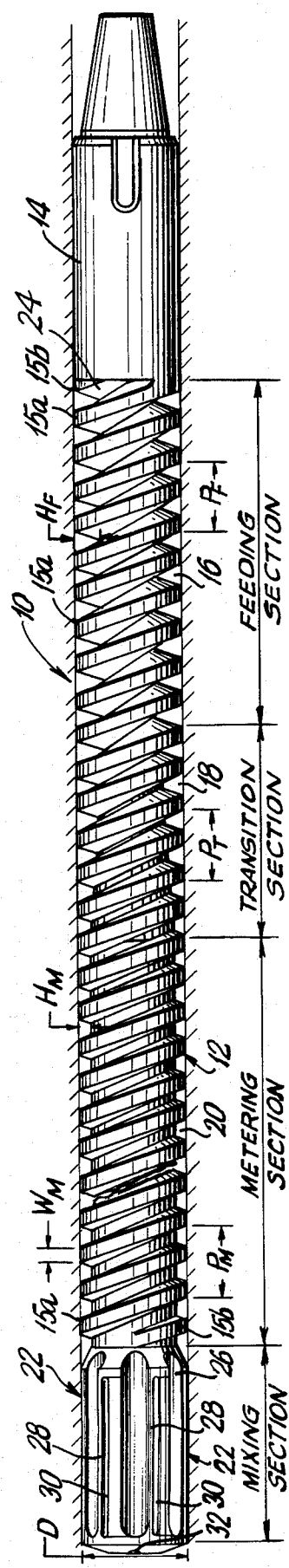
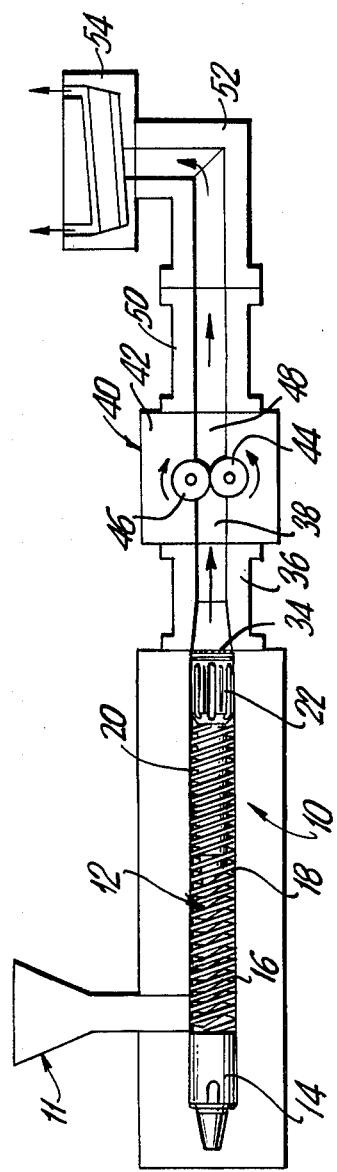

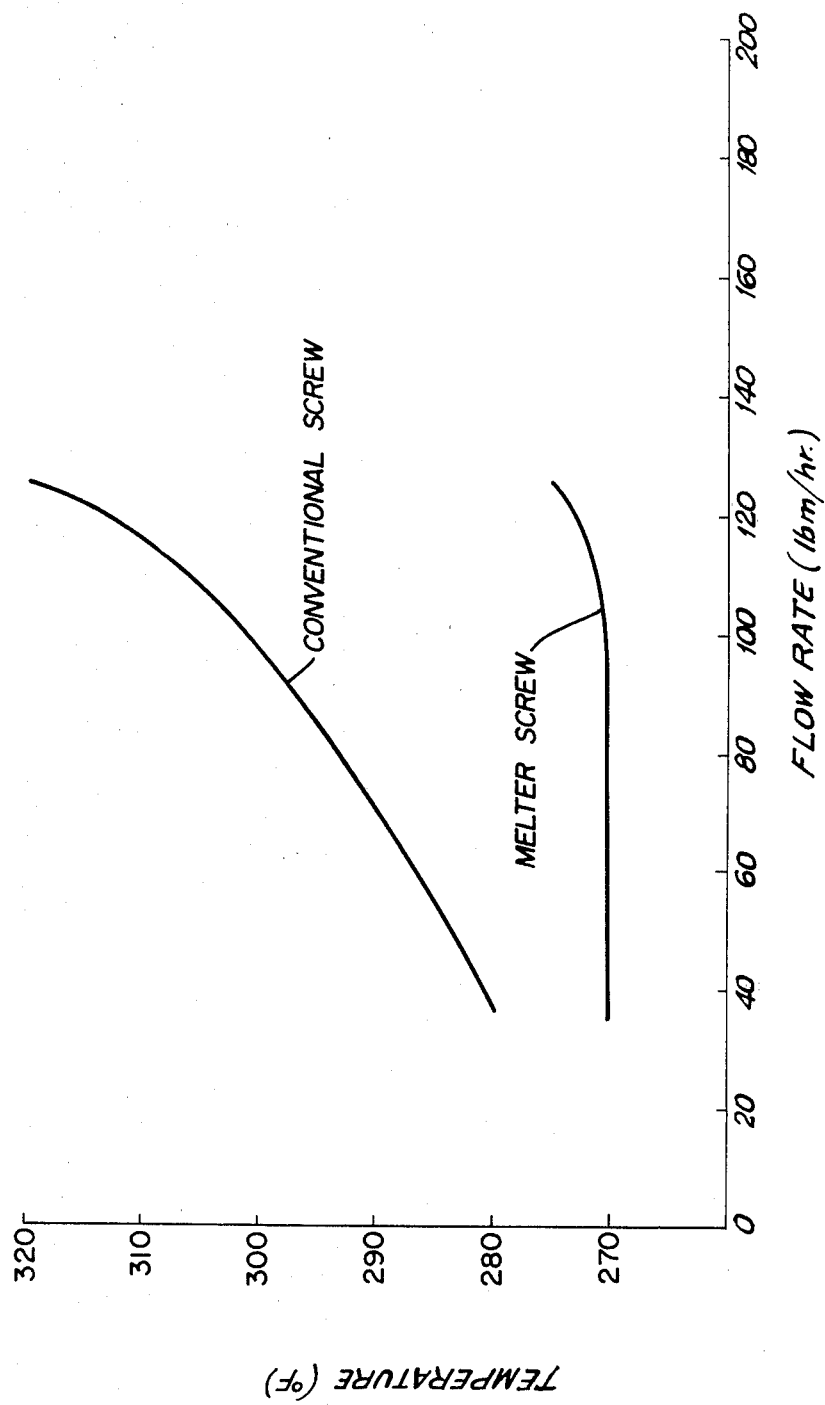

LOW-ENERGY EXTRUDER-PUMP SYSTEM

The present invention relates to method and apparatus for a low energy extrusion-pumping system and, more particularly, to such method and apparatus employing initial extrusion melting in accordance with the invention followed by subsequent passage of the extrudate through a low energy, rotary gear pump.

An extruder screw ordinarily has a plurality of sections which are of configuration specially suited to the attainment of particular functions. Examples are "feed" sections and "metering" sections, which are of basic importance and are present in nearly all extruders for handling thermoplastic polymers.

A typical extruder screw feed section extends beneath and forwardly from a feed opening where polymer in pellet or powder form is introduced into the extruder to be carried forward along the inside of the barrel by the feed section of the screw. In this section the channel depth of the screw is usually large enough to over-feed the solid polymer. This is a desirable effect because of over-feeding action serves to compact and pressurize the polymer particles and form a solid bed of advancing material.

The working of the material generates heat, and melting of the polymer proceeds as the material is moved along the feed section of the screw. Actually, most of the melting occurs near the barrel surface at the interface between a thin melt film and the solid bed of polymer. This general pattern persists until a substantial portion of the polymer reaches the melted state. After some 40 to 70 percent of the polymer has been melted, solid bed breakup usually occurs, and at this time particles of solid polymer become dispersed in the polymer melt. From this point on, it often is advantageous to intimately mix the polymer melt with the unmelted material to accelerate melting and minimize local nonuniformities.

An extruder screw "metering" section has as its special function the exertion of a pumping action on the molten polymer. Ordinarily the throughput achieved by a screw is thought of as being a function of the combination of the "drag flow" and "pressure flow" effects of the metering section.

Drag flow is basically the flow which results from the relative movement between the screw and the internal surface of the extruder barrel. It may be thought of as being proportional to the product of the average relative velocity and the channel cross-sectional area. This drag flow component is directed toward the outlet end of the screw. It may be increased by increasing the speed of the screw and/or by increasing the depth of the flow channel in the screw.

Acting in opposition to drag flow is a pressure flow component stemming from the reluctance of the material to flow through the restricted outlet opening at the end of the extruder passage. The speed of the screw does not directly affect the pressure flow component but, of course, it may affect such factors as back pressure and material viscosity, which factors, in turn, affect significantly the pressure flow component. On the other hand, pressure flow is directly affected by both the depth and length of the screw channel; an increase in channel depth has a tendency to increase greatly the pressure flow component and an increase in channel length has a tendency to reduce this back flow component.

In addition to the basic "feed" and "metering" sections, an extruder screw also may include a number of other distinct sections. Nearly all screws include, for example, so called "transition" sections. Also a final downstream mixing section may preferably be employed.

Over the years there has been a trend toward the use of extruders capable of high outputs. In many applications, various economies in production are possible where high extruder outputs can be obtained on a reliable basis.

It is the object of the invention to provide an improved method for increasing throughput rates and/or reducing processing temperatures in the melting, extrusion and pumping of synthetic thermoplastic materials.

Other aims and objectives will be apparent from the following description and appended claims.

In accordance with the present invention, a method is provided for the low energy melting, extrusion and pumping of synthetic thermoplastic materials comprising passing such materials continuously to and through an extruder having successive feeding, transition, metering and mixing sections; a double-flighted extruder screw forming the feeding, transition and metering sections, in cooperation with the cylindrical interior of the outer extruder housing, having equal outer diameter, thread width and lead, high thread pitch in the feeding, transition and metering sections, a decreasing root depth of the threads of said transition section between relatively deep root depth in said feeding section to relatively shallow root depths in said metering section, said mixing section having a plurality of flutes formed by alternate groove and land means arranged to extend substantially longitudinally in the surface thereof and capable of effecting final and complete melting and mixing of the polyolefin material before discharge from the extruder; and wherein the extrudate from said extruder is then successively passed through a breaker plate and an upstream adapter member, to the inlet of a radial gear pump which, in turn, discharges, through a downstream adapter member, to a die.

It has been found that the extruder screws conventional to the prior art are ineffective in providing the low energy melting efficiency necessitated by the system of the present invention. The fluted melter screw of the present invention provides a relatively short, double-flighted, highly efficient melter screw. The system relies for pumping not on a high pressure extruder, but on the melt pump (gear pump) positioned downstream of and acting in tandem with the extruder, prior to the passage of the extrudate to the forming die.

Reference is here made to U.S. Pat. No. 4,137,023 issued Jan. 30, 1979 to I. Moked, et al. and entitled "Low Energy Recovery Compounding and Fabricating Apparatus for Plastic Materials" which discloses and claims a gear or melt pump of the type referred to hereinabove. As disclosed therein, it is known to operate an extruder and a gear pump in combination, thereby separating the pumping operation and reserving it to a gear pump and using the extruder to perform the fluxing and mixing operations prior to delivery of the extrudate to the gear pump for the pumping operation.

The prior art does not, however, teach or suggest what changes are necessary in either an extruder or the gear pump employed in combination in such a system. The present invention deals specifically with the extruder (essentially extruder screw limitations and combinations) which are necessary to provide an extruder suitable for combination with a selected melt or gear pump to provide a low energy extrusion-pumping system.

It has been found that a unique combination of extruder sections are required of a melting extruder to be used in such a low energy extrusion-pumping system required for the handling of such synthetic thermoplastic materials.

Such an extruder should employ a double-flighted melter screw for use in an extruder in combination with a gear pump to form a melting and pumping system. Such melter screw has a successive inlet feeding section, a transition section, a metering section and a mixing section at the downstream end thereof. Each of such feeding, transition and metering sections having an equal outer diameter, thread width and lead, decreasing root depth of the threads of the transition section between relatively deep root depth in the feeding section to relatively shallow root depths in the metering section.

The pitches of the threads in each of the feeding, transition and metering sections are much higher than pitches conventionally employed in the prior art. Thus, for a 2.5-inch diameter screw, pitches of the order of 3.5-inches are employed as against a 2.5-inch pitch as used in prior art screw threads.

The mixing section has a plurality of groove means arranged to extend substantially longitudinally in the surface thereof. The groove means are preferably open at the upstream ends and closed at the downstream ends, hollow internal passage means positioned axially within the mixing section over a substantial portion of its terminal length. Preferably, a plurality of radial inlet conduits communicate between said internal passage means and the exterior of the mixing section, the inlet conduits being positioned between a pair of lands which are positioned, in turn, between the groove means.

In the drawings:

FIG. 1 is a vertical elevational schematic view, partially in section, of an extruder screw embodying the invention;

FIG. 2 is a vertical elevational schematic view showing the apparatus components of the low-energy extruder-rotary (melt) gear pump of the invention; and FIG. 3 is a graphical representation of the temperature versus flow rate for the use of a "conventional" extruder screw of the prior art as compared with the use of the melter extruder screw in accordance with the present invention.

Although the drawings primarily illustrate extruder screws suitable for practicing the method of the present invention, it will be understood that the extruder screw is utilized in a normal environment, i.e., in cooperative association with conventional frame means, a horizontally-extending barrel, feed and hopper means and a drive means and breaker plate, all of which are not shown and constitute apparatus known to the art. Merely as illustrative, the extruder screws may be employed in conjunction with apparatus of the type disclosed in U.S. Pat. Nos. 4,155,655 and 4,053,143, and as shown schematically in FIG. 2 of the drawings.

Referring specifically in FIGS. 1 and 2 of the drawings, apparatus embodying the invention and most preferred for practicing the method aspects of the invention is provided having an extruder housing 10 with a material inlet hopper 11 and a multi-section, double-flighted extruder screw 12 positioned therein having a drive portion 14 at the rearward end thereof; screw flights 15a and 15b; a feeding section 16 immediately downstream thereof; a transition section of varying screw root depth next downstream thereof; a metering section 20 next downstream thereof and a terminal fluted mixing section 22 at the downstream end thereof.

The feeding, transition and metering sections of the screw all have double-flighted threads of equal lead (lead=pitch/number of flights), such section pitches being indicated by $P_F$, $P_T$ and $P_M$ in the drawings. It is important that these extruder screw sections be double-flighted in order to be able to deliver to the material passing through the energy required for melting in the relatively short stay in passage through the extruder occasioned by the greater pitch-to-diameter ratio here employed, as against the lower pitch-to-diameter ratios employed in conventional screws.

The thermoplastic material (not shown) to be extruded is fed in particulate form (such as pellets, granules, particles, powders and the like) through the extruder housing 10 near the upstream end 24 of the feeding section 16. The thermoplastic material is thus passed through the feeding section having a uniform root depth $H_F$ and is initially compacted and compressed in the feeding section which serves to develop heat within the material and effect the beginnings of melting of the solid material by the time it is passed into the transition section 18.

In the transition section, the screw root depth successively decreases from a value of $H_F$ to a value of $H_M$, the screw root depth of the metering section. The material passing through the transition section continues to melt, initially interfaces between already molten polymer and solid compacted particulate material, to a point where solid particles break up and small particles of solid polymer become dispersed in the main body of now primarily molten polymer material.

A subsequent mechanical working and pumping of the molten polymer is achieved in metering section 20 of the screw (as shown in FIG. 1) from where the primarily polymer melt is passed to the final section, the mixing section 22. The mixing section is of the type which is disclosed and claimed in U.S. Pat. No. 3,730,492 issued May 1, 1973 to B. H. Maddock and entitled "Mixing of Thermoplastic Materials". Such a mixing head or section is referred to as a "fluted mixing head of the outside-in-type", indicating that the passage of material is from the outside flutes through radial passages to a central axial internal passage from which it is discharged through the downstream end of the mixing section 22.

Final mixing and complete homogenization of fully molten polymer material is carried out in the mixing section. As the material is broken into a number of streams, each entering a successive inlet fluted passage 26, it is forced from such passages over the intervening, leading lands 28 to the slots 30 which communicate to a central axial internal passage in which the molten streams join and are passed axially from the mixing section through discharge passage 32 at the discharge end of the extruder screw. The discharged material is passed from the extruder 10 through breaker plate 34 to an upstream adapter section 36 and into the inlet passage 38 of melt (gear) pump 40.

Such a melt pump, as described and claimed in U.S. Pat. No. 4,032,391, comprises an outer body or housing 42 having positioned therein a pair of rotary gears 44 and 46 which are parallel, intermeshing and counter-rotating and which pass the incoming material from inlet passage 38 of melt pump 40 around the outer wall portions of the inner chamber (not shown) of the melt pump. The melt streams which pass around the melt pump gears rejoin to form a single stream in the discharge passage 48 through which it passes from the melt pump.

The molten material discharged from the melt pump passes through downstream adapter passage 50 and, in turn, through the die adapter 52 from whence it passes to die member 54.

In selecting an extruder and melt pump combination for the low energy extrusion-pumping system of the invention, it is important to insure that the feeding or pumping requirements of the application of the system are met. In this case, the pressure and throughput rate requirements of the die assembly will determine the capacity of the melt pump required to perform the use or application requirements of the over-all extrusion-pumping system. Such selection of a suitable melt pump will leave to the extruder all melting and mixing requirements of the system. In this sense, it is important that the extruder be matched to the melt pump so that it feeds to the melt pump inlet exactly the throughput demands of the melt pump. Extrusion of lesser amounts of molten material will cause undesirable results from "starvation rate feeding" and extrusion of amounts exceeding this will result in flooding of the melt pump and eventually undesirable backlogging and backflow of melt material to the upstream end of the extruder.

Accordingly, the extruder parameters and differential rotation speeds of the extruder and gear pump (as measured by pressure transducer control means positioned in the adapter section 36) are so selected to achieve an extruder output rate matching the throughput rate of the melt pump. The accomplishment of this matching produces a lower energy operation of the extruder from that required in or encountered in conventional extruders of the prior art, thereby permitting low temperature and low pressure extruder operation (low energy) and assuring that the system combination of melt pump and extruder provides the required pumping system at a far lower level of energy consumption than was attainable in conventional systems of the prior art.

The method of the present invention may be practiced in the processing of any synthetic thermoplastic material, or blends thereof, in particulate form.

In examples of the present invention, a series of tests were carried out in extruders operated at four different rates of rotation, one extruder employing the melter screw of the present invention and the other extruder employing a conventional screw of the prior art. All tests were carried out with high pressure process, low density, pelleted polyethylene resin having 2.0 Melt Index; and all tests were carried out at 250 psi, barrel temperature 240° F. The results of these tests are set forth in Table I.

As set forth herein "LBM/hr" denotes pounds mass per hour.

TABLE I

| Melter Screw | Rate (lbm/hr) | 36.9 | 66.6 | 97.8 | 124.5 |
|---|---|---|---|---|---|
| | Melt Temp. (°F.) | 270 | 270 | 270 | 275 |
| | KW | 1.25 | 3.22 | 5.94 | 8.53 |
| Conventional Screw | Rate (lbm/hr) | 37.2 | 63 | 97.8 | 124.2 |
| | Melt Temp. (°F.) | 280 | 287 | 300 | 320 |
| | KW | 2.83 | 5.68 | 8.51 | 11.69 |

In another series of tests, the same material was treated in an extruder employing a conventional screw with the parameters as shown in Table II in order to form a basis of comparison with the low temperature melter screw of the invention having the parameters of Table III and providing the results set forth in Table IV.

TABLE II

Conventional Screw:

| | |
|---|---|
| Diameter: 2½ inches | Number of Flights: 1 |
| Length: 60.0 inches | Lead Length: 1 Diameter [2.50 inches] |
| L/D: 24:1 | Flight Width: 0.25 inches |
| Feed Section: 6 L/D | 0.45 inches deep |
| Transition Section: 6 L/D | 0.45 inches tapering to 0.135 inches deep |
| Metering Section: 10 L/D | 0.135 inches deep |
| Mixing Section: 2.0 L/D, 5 channels | Fluted Mixer 0.160 inches deep |

TABLE III

Low Temperature, melter screw:

| | |
|---|---|
| Diameter: 2½ inches | Number of Flights: 2 |
| Length: 40½ inches | Lead Length: 1.4 Diameters [3.5 inches] |
| L/D: 16.2:1 | Flight Width: 0.250 inches |
| Feed Section: 4.5 L/D | 0.450 inches deep |
| Transition Section: 4.0 L/D | 0.450 inches tapering to 0.160 inches deep |
| Metering Section: 5.0 L/D | 0.160 inches deep |
| Mixing Section: 2.7 L/D, 5 channels | Internal Fluter Mixer, 0.160 inches deep |

As shown in FIG. 3 of the drawings, the curves graphically set forth the relationship of the data of Tables I and II with respect to temperature and flow rate of the extruder.

It is to be understood that the "conventional" screw has: a 6 diameter feed section (0.450 in. deep); a 6 diameter transition section (0.135 in. deep); a 10.0 diameter metering section (0.135 in. deep); a 2.0 diameter mixing section (external fluted); single flighted 24:1 L/D; 2.50 in. lead.

It is also to be understood that the "melter" screw of the invention has: 4.5 diameter feed section (0.450 in.); 4.0 diameter transition section (0.160 in.); 5 diameter metering section (0.160 in.); 2.7 diameter mixing (internal mixer); double flighted 16.2:1 L/D; 3.5 in. lead.

Examples of comparative data between the systems embodying the invention and those conventional systems of the prior art are set forth in Table IV for "Pump" Data employing the present invention and "Conv." denoting data for comparative apparatus of the prior art. Two sets of data are presented in the first double column for comparison with operation at throughput rates of the order of 50 pounds per hour; the second double column indicating such comparable data for comparison at a throughput rate of about 100 pounds per hour; and the third double column setting forth compable data at throughput rates of about 150 pounds per hour (all employing a low density polyethylene material pelleted in form, produced by a low pressure process and having a 2.0 Melt Index, test being carried out at the pressures and temperatures indicated in Table IV.

TABLE IV

|  | PUMP | CONV | PUMP | CONV | PUMP | CONV |
|---|---|---|---|---|---|---|
| Barrel Temps. | | | | | | |
| Feeder Section (°F.) | 240 | 240 | 240 | 240 | 240 | 240 |
| Transition Section (°F.) | 272 | 272 | 330 | 330 | 330 | 330 |
| Metering Section (°F.) | 272 | 272 | 279 | 279 | 290 | 290 |
| Upstream Adapter (°F.) | 242 | 242 | 246 | 246 | 262 | 262 |
| Melt Pump (°F.) | 291 | — | 315 | — | 350 | — |
| Downstream Adapter (°F.) | 232 | — | 292 | — | 263 | — |
| Melt Temperature (°F.) | 313 | 329 | 356 | 387 | 383 | 430 |
| Inlet Pressure (psi) | 250 | — | 250 | — | 350 | — |
| Die Pressure (psi) | 3300 | 3300 | 4700 | 4700 | 5200 | 5200 |
| Extruder RPM | 29 | 30 | 55 | 62 | 84 | 94 |
| Melt Pump RPM | 16 | — | 34 | — | 53 | — |
| Total HP | 6.0 | 6.9 | 13.5 | 16.6 | 20.9 | 27.8 |
| Throughput Rate (lb/hr) | 53.4 | 50 | 101.4 | 100 | 150.6 | 150 |

What is claimed is:

1. A double-flighted melter screw for use in an extruder in combination with a gear pump to form a melting and pumping system, said melter screw successively having an inlet feeding section, a transition section, a metering section and a mixing section at the downstream end of said screw, each of said feeding, transition and metering sections having a substantially equal outer diameter, thread width and lead, high thread pitch in the feeding, transition and metering sections, decreasing root depth of the threads of said transition section between relatively deep root depth in said feeding section to relatively shallow root depth in said metering section; said mixing section having a plurality of flutes formed by alternate groove and land means arranged to extend substantially longitudinally in the surface thereof and capable of effecting substantially complete, final melting and mixing and complete homogenization of the material before discharge from the extruder.

2. A melting and pumping system comprising a melting extruder having an outer housing member enclosing a melter screw in accordance with claim 1, and discharging, through a breaker plate and an upstream adapter member, to the inlet of a rotary gear pump which, in turn, discharges, through a downstream adapter member, to a die member.

3. A melting and pumping system comprising a melting extruder in accordance with claim 2, and discharging, through a breaker plate and an upstream adapter member having a decreasing diameter in the downstream direction, to the inlet of a rotary gear pump which, in turn, discharges, through a downstream adapter member of substantially constant diameter, to a die member.

4. A method for the extrusion of synthetic thermoplastic materials comprising passing such materials continuously to and through a rotary extruder having a successive feeding, transition, metering and mixing section; the extruder screw forming the feeding, transition and metering sections, in cooperation with the cylindrical interior of the outer extruder housing, having equal outer diameter, thread width and lead, high thread pitch in the feeding, transition and metering sections, decreasing root depth of the threads of said transition section between relatively deep root depth in said feeding section to relatively shallow root depth in said metering section, said mixing section having a plurality of flutes formed by alternate groove and land means arranged to extend substantially longitudinally in the surface thereof and capable of substantially complete, final melting and mixing and complete homogenization of the material before discharge from the extruder; and wherein the extrudate from said extruder is successively passed through a breaker plate and an upstream adapter member, to the inlet of a rotary gear pump which, in turn, discharges, through a downstream adapter member, to a die.

5. A double-flighted melter screw for use in an extruder in combination with a gear pump to form a melting and pumping system, said melter screw successively having an inlet feeding section, a transition section, a metering section and a mixing section at the downstream end thereof, each of said feeding, transition and metering sections having an equal outer diameter, thread width and lead, high thread pitch in the feeding, transition and metering sections, decreasing root depth of the threads of said transition section between relatively deep root depth in said feeding section to relatively shallow root depth in said metering section; said mixing section having a plurality of groove means arranged to extend substantially longitudinally in the surface thereof, said groove means open at the upstream ends and closed at the downstream ends, hollow internal passage means positioned axially within said mixing section over a substantial portion of its terminal length, and a plurality of radial inlet conduits communicating between said internal passage means and the exterior of said mixing section, said inlet conduits being positioned between a pair of lands which are positioned, in turn, between said groove means.

6. A melting and pumping system comprising a melting extruder having an outer housing member enclosing a melter screw in accordance with claim 5, and discharging, through a breaker plate and an upstream adapter member, to the inlet of a rotary gear pump which, in turn, discharges, through a downstream adapter member, to a die member.

7. A melting and pumping system comprising a melting extruder in accordance with claim 6, and discharging, through a breaker plate and an upstream adapter member having a decreasing diameter in the downstream direction, to the inlet of a rotary gear pump which, in turn, discharges, through a downstream adapter member of substantially constant diameter, to a die member.

8. A method for the extrusion of synthetic thermoplastic materials comprising passing such materials continuously to and through a rotary extruder having a successive feeding, transition, metering and mixing section; the extruder screw forming the feeding, transition and metering sections, in cooperation with the cylindrical interior of the outer extruder housing, having equal outer diameter, thread width and lead, decreasing root depth of the threads of said transition section between relatively deep root depth in said feeding section to relatively shallow root depths in said metering section, said mixing section having a plurality of groove means arranged to extend substantially longitudinally in the surface thereof, said groove means open at the upstream ends and closed at the downstream ends, hollow internal passage means positioned axially within said mixing section over a substantial portion of its terminal length, and a plurality of radial inlet conduits communicating between said internal passage means and the exterior of said mixing section, said inlet conduits being positioned between a pair of lands which are positioned, in turn, between said groove means; and wherein the extrudate from said extruder is successively passed through a breaker plate and an upstream adapter member, to the inlet of a rotary gear pump which, in turn, discharges, through a downstream adapter member, to a die.

* * * * *